US012796597B2

(12) United States Patent
McCutcheon, IV et al.

(10) Patent No.: US 12,796,597 B2
(45) Date of Patent: Nov. 17, 2026

(54) MOWER COMPONENTS

(71) Applicant: ASI Landscaping, LLC, Mendon, UT (US)

(72) Inventors: Robert Johnstone McCutcheon, IV, Longmont, CO (US); Davis Thorp Foster, Boulder, CO (US); Kyle James Forster, Brightwaters (AU); Matthew Alexander Kaplan, Bellvue, CO (US)

(73) Assignee: ASI Landscaping, LLC, Mendon, UT (US)

( * ) Notice: Subject to any disclaimer, the term of this patent is extended or adjusted under 35 U.S.C. 154(b) by 837 days.

(21) Appl. No.: 17/946,961

(22) Filed: Sep. 16, 2022

(65) Prior Publication Data

US 2023/0086965 A1 Mar. 23, 2023

Related U.S. Application Data

(60) Provisional application No. 63/245,498, filed on Sep. 17, 2021.

(51) Int. Cl.

| | |
|---|---|
| ***A01D 34/73*** | (2006.01) |
| ***A01D 34/00*** | (2006.01) |
| ***A01D 34/68*** | (2006.01) |
| ***A01D 34/71*** | (2006.01) |

(Continued)

(52) U.S. Cl.

CPC ........... *A01D 34/73* (2013.01); *A01D 34/006* (2013.01); *A01D 34/68* (2013.01); *A01D 34/71* (2013.01); *A01D 34/81* (2013.01); *A01D 2101/00* (2013.01)

(58) Field of Classification Search

CPC ...... A01D 34/73; A01D 34/006; A01D 34/68; A01D 34/71; A01D 34/81; A01D 2101/00

See application file for complete search history.

(56) References Cited

U.S. PATENT DOCUMENTS

| | | | | |
|---|---|---|---|---|
| 3,795,095 A * | 3/1974 | Erickson | ............. | A01D 43/077 56/320.2 |
| 4,318,268 A | 3/1982 | Szymanis | | |
| 4,936,884 A | 6/1990 | Campbell | | |

(Continued)

FOREIGN PATENT DOCUMENTS

| | | | |
|---|---|---|---|
| DE | 102014206268 A1 * | 10/2015 | ............. A01D 69/02 |
| EP | 1731013 A1 * | 12/2006 | ........... A01D 34/005 |

(Continued)

OTHER PUBLICATIONS

Translation of Document WO-2020167825-A1 as retrieved on Jun. 6, 2025 (Year: 2020).*

(Continued)

*Primary Examiner* — William D Hutton, Jr.
*Assistant Examiner* — Jose A. Martinez

(57) ABSTRACT

Embodiments of assemblies for use with mowers are provided herein. In some embodiments, an assembly includes: a substantially circular baffle body configured to at least partially surround a blade and defining a cutting chamber, the baffle body including an intake side and a discharge side, wherein an upper portion of the baffle body includes a discharge opening proximate the discharge side and a diameter of the baffle body is less than or equal to approximately one half of an inch larger than a diameter of the blade.

12 Claims, 8 Drawing Sheets

(51) Int. Cl.
*A01D 34/81* (2006.01)
*A01D 101/00* (2006.01)

(56) References Cited

U.S. PATENT DOCUMENTS

| | | | | |
|---|---|---|---|---|
| 5,209,052 | A | 5/1993 | Carroll | |
| 5,499,495 | A * | 3/1996 | Heisman | A01D 34/82 56/320.1 |
| 5,775,078 | A | 7/1998 | Warren | |
| 6,101,794 | A | 8/2000 | Christopherson et al. | |
| 6,705,068 | B2 * | 3/2004 | Iida | A01D 34/826 56/320.2 |
| 7,146,791 | B2 | 12/2006 | Benway et al. | |
| 9,888,626 | B2 | 2/2018 | Gilpatrick et al. | |
| 10,070,578 | B2 * | 9/2018 | Kuriyagawa | A01D 34/6806 |
| 11,119,495 | B2 * | 9/2021 | Uemura | G05D 1/0278 |
| 2008/0047249 | A1 * | 2/2008 | Davis | A01D 34/71 56/320.2 |
| 2015/0359171 | A1 | 12/2015 | Butler | |
| 2019/0045707 | A1 | 2/2019 | Patridge | |
| 2019/0380272 | A1 * | 12/2019 | Weihl | A01D 34/668 |
| 2020/0120866 | A1 * | 4/2020 | Conrad | A01D 34/008 |
| 2020/0260642 | A1 * | 8/2020 | Desai | A01D 34/54 |
| 2020/0267430 | A1 | 8/2020 | Yue | |
| 2020/0352094 | A1 * | 11/2020 | Desai | A01D 42/005 |
| 2020/0367430 | A1 | 11/2020 | Ito | |
| 2021/0185912 | A1 * | 6/2021 | Wilks | A01D 34/69 |
| 2021/0321564 | A1 | 10/2021 | Yamaoka et al. | |
| 2022/0129000 | A1 * | 4/2022 | Ingvalson | G05D 1/227 |

FOREIGN PATENT DOCUMENTS

| | | | | |
|---|---|---|---|---|
| EP | 3366103 | B1 | 9/2019 | |
| WO | WO-2020167825 | A1 * | 8/2020 | A01D 34/73 |

OTHER PUBLICATIONS

Translation of Document EP-1731013-A1 as retrieved on Jun. 6, 2025 (Year: 2006).*

Translation of Document EP 1731013 A1 as retrieved on Nov. 28, 2025 (Year: 2006).*

Translation of Document DE-102014206268-A1 as retrieved on Nov. 28, 2025 (Year: 2015).*

Translation of Document EP-3366103-B1 as retrieved on May 29, 2025 (Year: 2019) .

* cited by examiner

MOWER COMPONENTS

CLAIM OF PRIORITY

This application claims priority to U.S. Provisional Patent Application Ser. No. 63/245,498, filed Sep. 17, 2021, which is herein incorporated by reference in its entirety.

BACKGROUND

Mowers typically use rotary type blades for cutting. Various components utilize energy during mowing, such as when providing torque to motors that control motion of a mower, as well as those which turn the blades of the mower. Increased energy consumption can lead to shortened battery life or the need to increase a battery size, in the case of electric mowers, and/or shortened life or the need for larger fuel tanks in the case of mowers which rely on combustion engine technology.

BRIEF DESCRIPTION OF THE DRAWINGS

Examples of the present disclosure, briefly summarized above and discussed in greater detail below, can be understood by reference to the illustrative examples of the disclosure depicted in the appended drawings. However, the appended drawings illustrate only typical examples of the disclosure and are therefore not to be considered limiting of scope, for the disclosure may admit to other equally effective examples.

Figure 1A:
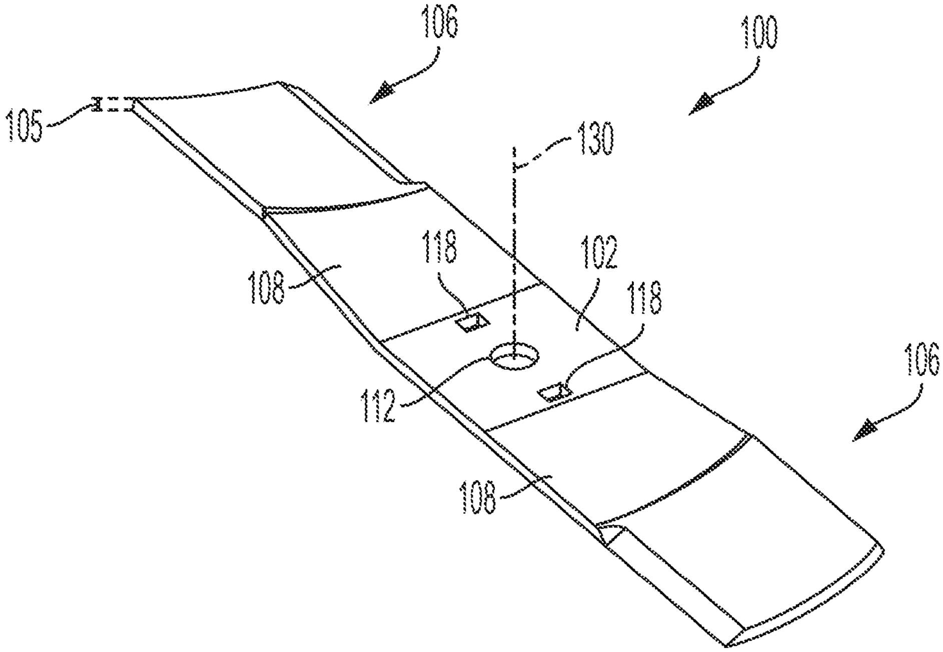
FIG. 1A depicts an isometric view of a blade for a lawn mower in accordance with at least some examples of the present disclosure.

To facilitate understanding, identical reference numerals have been used, where possible, to designate identical elements that are common to the figures. The figures are not drawn to scale and may be simplified for clarity. Elements and features of one example may be beneficially incorporated in other examples without further recitation.

DETAILED DESCRIPTION

Various techniques (methods, systems, apparatus, etc.) are described herein which may improve the effective operating time (e.g., battery life, efficiency, etc.) of a mower (whether electric, combustion engine, or some combination thereof) by providing an enhanced design for multiple components of a lawn mower, including, but not limited to blades, decks, etc. Further, the techniques described in detail herein may improve an overall cut quality of lawn when using the components described. As non-limiting examples of such, the components described herein may promote even cuts (e.g., by ensuring grass blades are standing up), increase the amount of mulching of grass prior to discharge, as well as ensure any discharge is in optimal locations. In some examples described herein, a lawn mower blade may have an airfoil region having a non-zero camber configured to reduce flow separation to improves blade efficiency. For example, such a design creates a smoother transition from a lower pressure side of the blade to the free stream flow, minimizing vortex production and shedding. In at least some examples, the blade may operate in a non-stall condition as opposed to a stalled condition. In a non-stall condition, the blade generally facilitates laminar or near-laminar flow over the blade. In a stalled condition, the blade generates large amounts of lift but also generates an exceptional amount of drag, causing flow separation and turbulent flow to occur almost immediately on the low pressure side of the blade, resulting in a decrease in blade efficiency. By utilizing the techniques described herein, a non-stall condition may be achieved to reduce the amount of drag (and, therefore, increase the efficiency) of operating such blades.

The blade may be installed in a deck of the mower. As will be described in detail herein, the geometry of the blade may allow for a greater increase in air speed around a bottom of blade, which in turn reduces the pressure under the blade. Such a pressure reduction under the blade may increase the mass flow into the deck, creating more suction and facilitating glass blades to stand up to be cut, improving mower cutting efficiency. The blade may be combined with a deck having a baffle having a discharge, such as a rear discharge, for providing better fertilization, safer operation, and increasing mower efficiency. The baffle and discharge advantageously may ensure that projectiles are maintained, and clipping are not spread over safety critical surfaces such as roadways, or the like. The baffle, combined with the blade, may promote the flow of clippings up and to the discharge of the mower. As will be described in detail herein, the baffle may be adjusted during operation to provide optimal efficiency in various situations, as well as allow for user control of mulching, etc. Further, such baffling and ducts may comprise various features to promote desired mass flow, mulching, etc. including, but not limited to, louvers, various shapes, Coanda inserts, and the like.

Figure 1B:
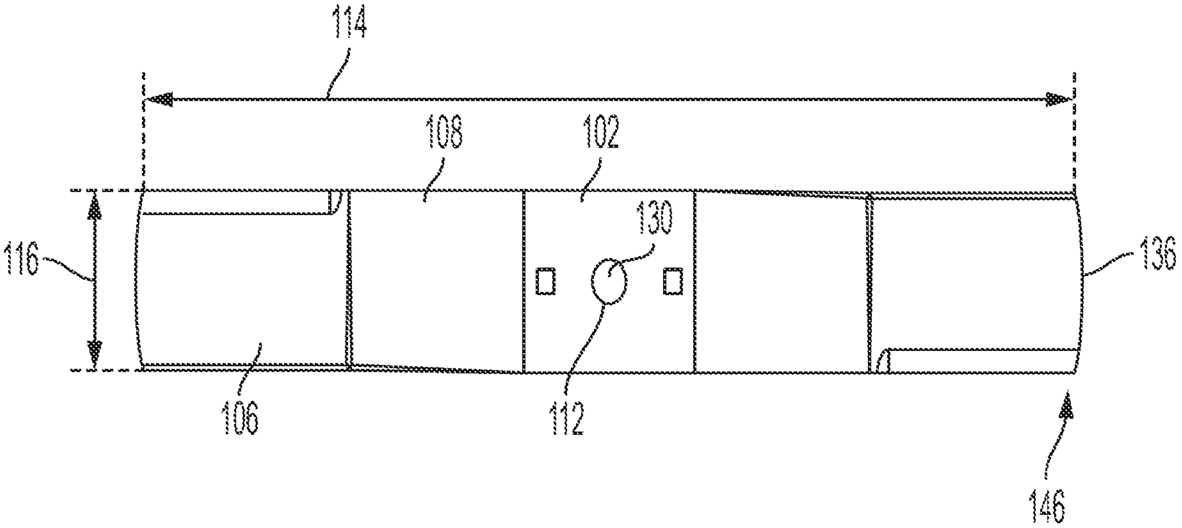
FIG. 1B depicts a top view of a blade for a lawn mower in accordance with at least some examples of the present disclosure.

FIG. 1A depicts an isometric view of a blade 100 for a mower in accordance with at least some examples of the present disclosure. FIG. 1B depicts a top view of a blade 100 for a mower in accordance with at least some examples of the present disclosure. In some examples, the blade 100 is a flat plate of material (such as high carbon steel, aluminum, or any other material able to withstand high amounts of torque while retaining shape) that is bent to create a non-zero camber. The blade 100 generally comprises a substantially flat central portion 102 having a rotational axis 130 configured to be coupled to a motor (see motor 418 in FIG. 4) for rotating the blade 100. In some examples, the central portion 102 has an opening 112 configured for coupling the blade 100 to the motor 418. In some examples, the flat central portion 102 includes one or more peripheral openings 118 disposed radially outward of the opening 112 for receiving one or more respective fasteners (see fasteners 810 in FIG. 8) to couple the blade 100 to a shaft of the motor 418.

In at least some examples, such as the examples shown in FIG. 1A, the blade 100 may include a distal portion 106 defined as an airfoil portion extending radially outward from opposing sides of the flat central portion 102. The distal portion 106 may be a region of the blade 100 predominantly used for cutting when mowing. Such an airfoil design may be any design capable of generating some amount of lift. In at least some such examples, the amount of lift may be determined to ensure that the blade is operating in a non-stall configuration during mowing (e.g., when spinning at up to 5000 rpm or higher).

Figure 2:
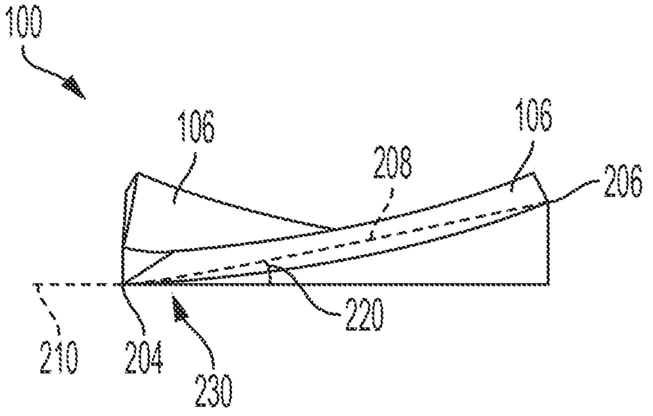
FIG. 2 depicts a side view of a blade for a lawn mower in accordance with at least some examples of the present disclosure.

In some examples, the distal portion 106 may be defined by a non-zero leading angle 220 defining an angle of attack. FIG. 2A depicts a side view of a blade 100 for a mower in accordance with at least some examples of the present disclosure. In some examples, the non-zero leading angle 220 of the distal portion 106 may be measured as an angle relative to a horizontal axis 210 originating from a bottom leading edge point 204 of the blade 100 and a line 208 projected between the bottom leading edge point 204 and a bottom trailing edge point 206. In some examples, the non-zero leading angle 220 may vary across one or more of the width and/or length of the blade 100.

In some examples, the non-zero leading angle 220 may be substantially constant across the distal portion 106. However, in other examples, such a non-zero leading angle 220 may vary over the radius of the blade (e.g., extending in a direction from the rotational axis 130) in any manner (e.g., linearly, exponentially, or otherwise). In some examples, the non-zero leading angle 220 at the distal portion 106 is about 15 degrees to about 45 degrees, although any other range is contemplated. In some examples, the non-zero leading angle 220 is about 25 to about 35 degrees.

The non-zero leading angle 220 being too low may lead to less efficient mass flow generation. The non-zero leading angle 220 being too high may lead to flow separation, resulting in uneven cutting. In some examples, the distal portion 106 curves upward from respective ones of the bottom leading edge point 204 on either side of the blade 100. In some examples, the distal portion 106 may curve upward about 0.4 to about 0.7 inches from the bottom leading edge point 204.

In some examples, the distal portion 106 may be further defined by a non-zero camber percentage. In various examples, an amount of camber is determined as a percentage of a chord width 116. As a non-limiting example, the non-zero camber percentage may be approximately 2 to 12 percent, however any other range is contemplated. In some examples, the amount of camber may vary along the length of the blade 100, e.g., linearly, non-linearly, or some combination thereof. In some examples, the non-zero camber percentage varies along the chord width 116 of the blade 100 such that at least a portion of a leading edge 230, for example, the leading edge 230 corresponding with the bottom leading edge point 204 of the distal portion 106, is substantially flat. In some examples, the leading edge 230 of the distal portion 106 is sharpened, as illustrated by the tapering of the blade to the bottom leading edge point 204.

In various examples, the distal portion 106 is dimensioned to be large enough to provide sufficient cutting revolutions and small enough as to avoid excessive strain on the material of the blade 100 which can lead to stress fracture. In some examples, a distal portion 106 comprises an outer (or distal) portion of the blade having a length of about 15% to about 30% of the radius of the blade 100 (e.g., the distance from the center to the distal end), though any percentage (from 0 to 100%) is contemplated. In some examples, a distal portion 106 comprises about 25 percent or less of a total length of the blade. In some examples, the cambered region may be located at other locations along a length 114 of the blade 100 from the opening 112 to a distal end 146.

In some examples, an intermediate portion 108 may be disposed between the flat central portion 102 and a distal portion 106. In such examples, the intermediate portion may be configured to minimize an amount of torsional stress between the central portion 120 and the distal portion 106. In some examples, the intermediate portion 108 is flatter on a side proximate the flat central portion 102 than a side proximate the distal portion 106.

In any example discussed herein, the blade 100 may further be defined by a thickness 105, and the thickness 105 may be based in part on the chord width 116. As a non-limiting example of such, the thickness 105 may be determined as a percentage, e.g., 10%, 15%, 5%, etc., of the chord width 116. In some examples, the chord width 116, or width of the blade 100, is about two to about three inches. In some examples, a thickness of the blade 100 is about 0.15 inches to about 0.2 inches. In some examples, a chord width 116 of the blade 100 is substantially the same across a length of the blade 100. Of course, it is contemplated that a thickness of the blade may vary across a length and/or width of the blade to achieve an ideal moment of inertia, increase an efficiency of spinning the blade, or otherwise achieve an optimal cut.

In some examples, the distal portion 106 may be curved about an edge 136 furthest from the rotational axis 130 based at least in part on a curve associated with a baffle surrounding the blade 100 when attached to the motor (discussed in more detail below). Such a curve of the blade 100 may be designed such that a minimal space is left between the distal portion of the blade and a wall of the housing or surrounding baffle when the blade is attached to the motor and spinning. In such examples, the edge 136 being curved advantageously improves suction underneath the blade 100 by reducing an amount of air from a high-pressure region that can leak over the edge 136 when the blade 100 is installed and in use.

Figure 3:
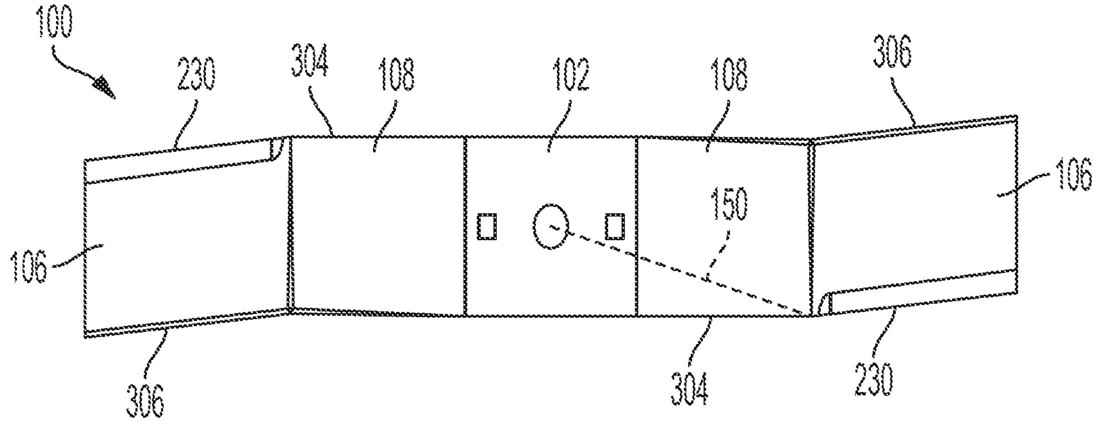
FIG. 3 depicts a top view of a blade for a lawn mower in accordance with at least some examples of the present disclosure.

FIG. 3 depicts a top view of a blade 100 for a mower in accordance with at least some examples of the present disclosure. In some examples, the leading edge 230 at the distal portion 106 may be swept backwards either linearly with respect to a radius 150 of the blade 100 as depicted in FIG. 3, or in a curve along the radius 150 such that the blade 100 creates more of a "slicing" instead of "hacking" motion on grass blades as the blade 100 rotates. In some examples, the leading edge 230 is swept backwards with respect to a leading edge 304 of the intermediate portion 108. A swept back geometry may increase the effective surface length of the blade 100 on a per-revolution basis. In some examples, the trailing edge 306 of the distal portion 106 is swept backwards similarly and in the same direction as the corresponding leading edge 230. In some examples, one or more of the leading edge 230 or the trailing edge 306 are tapered. An amount the distal portion 106 is swept back may be defined by a distance or an angle. In various examples, such a distance or angle may be determined based at least in part on one or more of a length of the blade 100, a length and/or width of the distal portion, or otherwise. As a non-limiting example of such, the distal portion 106 may be swept back by an angle of 1 degree, 2 degrees, 5 degrees, etc. relative to a line extending radially from the center of the blade 100. Each of the various elements of the blade design described herein may be incorporated separately. In other examples, multiple elements of blade design described herein may be incorporated together.

Figure 4:
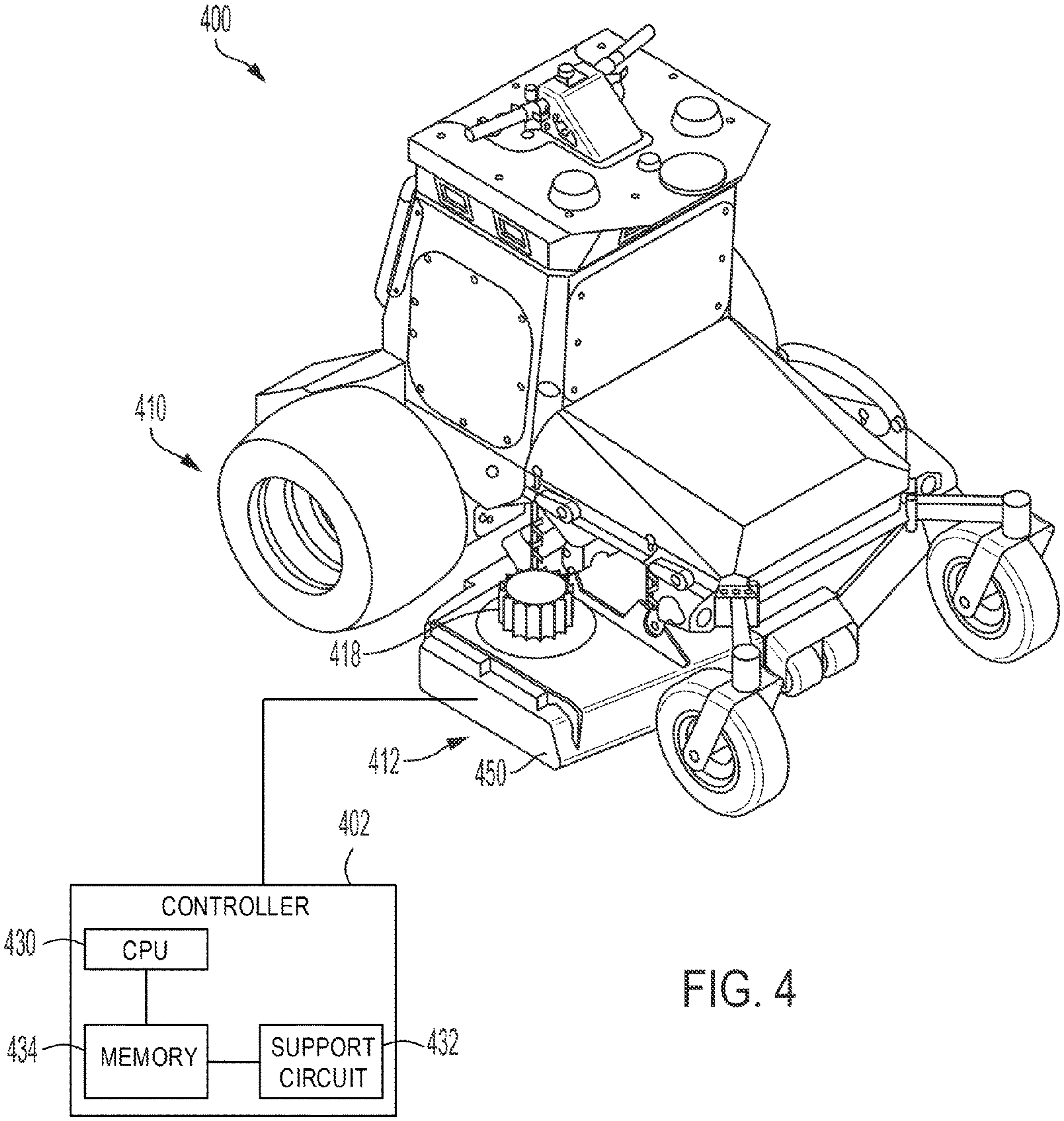
FIG. 4 depicts an isometric view of a mower in accordance with at least some examples of the present disclosure.

FIG. 4 depicts an isometric view of a mower 400 in accordance with at least some examples of the present disclosure. The mower 400 may generally include a plurality of wheels 410 configured to move the mower 400. A deck assembly 412 may be disposed between the plurality of wheels 410 and includes one or more blades 100 disposed therein and coupled thereto. The deck assembly 412 includes one or more motors 418 corresponding with the one or more blades 100. The mower 400 may be any suitable mower, for example, a lawn mower, a push mower, a riding mower, an autonomous mower, and the like. One particular example is an autonomous lawn mower of the type depicted in FIG. 4. In some examples, the mower 400 includes a sensor 450 configured to measure a parameter in the deck assembly 412. For example, the parameter may be strain of motor, torque, pressure, temperature, or the like. In other examples, the sensor 450 may comprise a perception system having at least one of an auditory system or visual system. For example, the auditory system may include a microphone. The visual system may include a camera to receive visual input.

Examples in accordance with the present disclosure may be implemented in hardware, firmware, software, or any combination thereof. Examples may also be implemented as instructions stored using one or more computer readable media, which may be read and executed by one or more processors. A computer readable medium may include any mechanism for storing or transmitting information in a form readable by a machine (e.g., a computing platform or a "virtual machine" running on one or more computing platforms). For example, a computer readable medium may include any suitable form of volatile or non-volatile memory. In some embodiments, the computer readable media may include a non-transitory computer readable medium. For example, a controller 402 controls the operation of the mower 400 and may be used to perform the methods described herein. In some examples, the controller 402 takes input from the sensor 450. In some examples, the controller 402 may be used to control the discharge openings 515 discussed in more detail below.

The controller 402 generally includes a central processing unit (CPU) 430, a memory 434, and a support circuit 432. The CPU 430 may be one of any form of a general-purpose computer processor that can be used in an industrial setting. The support circuit 432 is conventionally coupled to the CPU 430 and may comprise a cache, clock circuits, input/output subsystems, power supplies, and the like. Software routines, such as processing methods as described herein may be stored in the memory 434 and, when executed by the CPU 430, transform the CPU 430 into the controller 402. The software routines may also be stored and/or executed by a second controller (not shown) that is located remotely from the mower 400 (e.g., a mobile device, computer, etc.).

In operation, the controller 402 enables data collection and feedback from the mower 400, for example, from the sensor 450, to optimize performance of the mower 400 and provides instructions to system components. For example, the memory 434 can be a non-transitory computer readable storage medium having instructions that when executed by the CPU 430 (or controller 402) perform the methods described herein.

Figure 5:
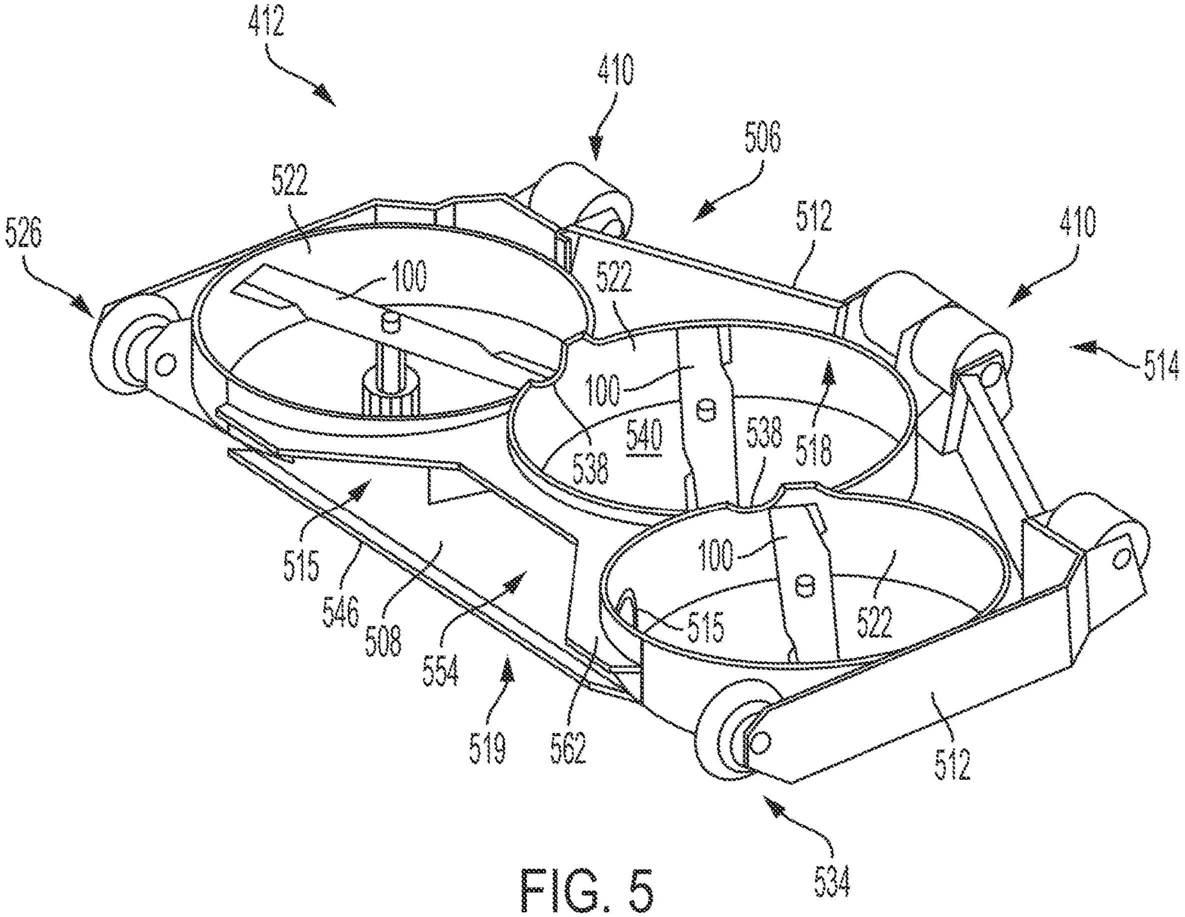
FIG. 5 depicts bottom isometric view of a deck assembly in accordance with at least some examples of the present disclosure.
Figure 6:
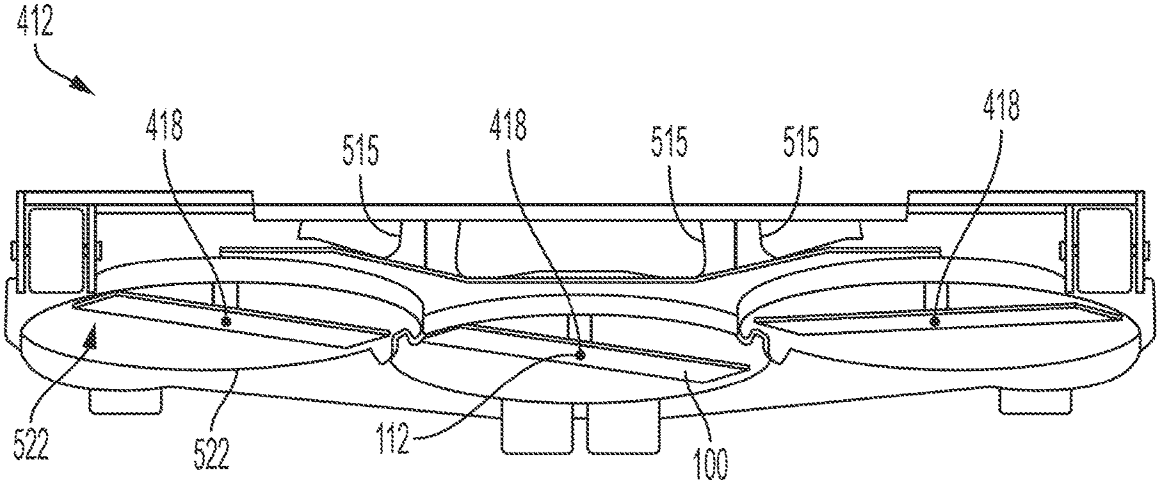
FIG. 6 depicts a schematic bottom isometric view of a deck assembly in accordance with at least some examples of the present disclosure.

FIG. 5 depicts bottom isometric view of a deck assembly 412 in accordance with at least some examples of the present disclosure. FIG. 6 depicts a schematic bottom isometric view of a deck assembly 412 in accordance with at least some examples of the present disclosure. The deck assembly 412 includes an intake side 514 and a discharge side 534. In some examples, the deck assembly 412 includes a deck housing 506 having an upper plate 508 and sidewalls 512 extending down from the upper plate 508 to define an interior volume 520 of the deck housing 506. The deck housing 506 generally includes a baffle body 518 coupled to the deck housing 506 within the interior volume 540. The baffle body 518 is disposed about the blade 100 for controlling air flow within the deck assembly 412 and promoting discharge of cut material in a particular direction. The baffle body 518 defines one or more cutting chambers 522, which in some examples may have a substantially circular structure with a diameter approximately equal to a diameter of the blade 100 to be used with the mower and at least partially encircling the blade 100. In some examples, a diameter of the one or more cutting chambers 522 of the baffle body 518 is less than or equal to approximately one half of an inch larger than a diameter of the blade 100, though any other distance is contemplated.

In some examples, the one or more cutting chambers 522 comprises three cutting chambers, as depicted in FIG. 5. Separate cutting chambers substantially prevent vortex interactions between adjacent blades 100. In some examples, the baffle body 518 includes a recess 538 disposed between adjacent ones of the one or more cutting chambers 522 to direct airflow therebetween. In some examples, the one or more cutting chambers 552 are arranged in a staggered position such that the rotational axis of the respective blades 100 disposed in the one or more cutting chambers 552 are not disposed along a common line. Such a staggering may, in some cases, ensure optimal aesthetic cuts. In some examples, one of the cutting chambers is disposed closer to the intake side 514 and two of the cutting chambers are disposed closer to the discharge side 534. In some examples, a gap between the blade 100 and the respective one of the one or more cutting chambers 522 is about 0.03 to about 0.25 inches, though any distance is contemplated. A small gap may improve efficiency of mass flow creation by reducing the vortex shedding that is generated when lift from the blade 100 is produced.

In some examples, the baffle body 518 may include one or more discharge openings 515 proximate the discharge side 534. For example, the baffle body 518 may include a discharge opening 515 for each of the one or more cutting chambers 522. In some examples, the one or more discharge openings 515 are disposed in an upper portion 526 of the baffle body 518. A size of the one or more discharge openings 515 can be adjusted to tune the amount of mulching-action performed by the deck assembly 412 (e.g., coarser or finer), and may be user-adjustable. The discharge openings 515 may be comprised of slats having an adjustable width and or height. The slats may ensure that clumps are not ejected, while the baffles overall may ensure that pressure above the blade is controlled. The size may be adjusted, for example, via sliding or rotating components that increase or decrease the size of the one or more discharge openings 515. Such modifications may further alter operation of the mower to discharge more clippings to the rear (creating a rear-discharge mower) and/or otherwise promoting airflow to keep clippings circulating internal to the chamber for longer periods of time to create a finer cut.

In some examples, such an adjustment may be performed by one or more processors associated with the mower 400 (such as for those mowers that are fully and/or partially autonomously controlled). For example, such an adjustment may be performed via the controller 402. In various examples, such discharge openings 515 may be louvers actuated by one or more motors. Such motors, in turn, may be controlled in accordance with a user interface (e.g., either on the mower itself or remote therefrom (e.g., a mobile device, computer, etc.), or otherwise adjusted during autonomous operation of the mower based on, for example, recognition of a type of grass to be mowed (e.g., as may be determined based on, for example, camera data on board the mower and available to the processor(s)), a user pre-defined preference, geographic area, or the like. In at least some examples, a pressure sensor located proximate the cavity housing the blades may be used for controlling opening or closing of the baffles (e.g., sensor 450). As a non-limiting example of which, an increase in pressure may trigger increasing one or more of a height or width of a baffle to reduce an amount of strain on the motor, decrease an amount of torque required to spin the blade at a desired speed, or the like.

A rear-upper portion 519 of the deck assembly 412 may include an exhaust opening 554 to allow for the exhaust of the airflow and particulate (e.g., clippings) that pass through the one or more discharge openings 515 of the deck assembly 412. A size of the exhaust opening 554 can be adjusted to tune the amount of mulching-action performed by the deck assembly 412 (e.g., coarser or finer), and may be user-adjustable. In some examples, such an adjustment may be performed by a processor associated with the mower 400 (such as for those mowers that are fully and/or partially autonomously controlled). Such controls may be similar or the same as those discussed in detail above. The size of the exhaust opening 554 may also control a pressure above the blades 100. In some examples, the baffle body 518 includes a rear lip 562 coupled to the one or more cutting chambers 522 that, together with the upper plate 508, partially defines the exhaust opening 554. In some examples, the rear lip 562 is raised with respect to a lower surface of the one or more cutting chambers 522.

In some examples, the baffle body 518 includes a discharge gate 546 that may be moved to adjust the size of the exhaust opening 554. The discharge gate 546 may be configured to facilitate ejecting smaller clippings and redirect larger clippings back into the one or more cutting chambers 522. For example, the discharge gate 546 may rotate with respect to the upper plate 508 to change the size of the exhaust opening 554. In another example, the discharge gate 546 may comprise a plurality of gates that slide laterally or rotate to adjust a width and height of the exhaust opening 554 or the discharge opening 515. In some examples, a portion of the baffle body 518 is adjustable to modify one or more of a length or a height of the discharge opening 515 or the exhaust opening 554.

The one or more discharge openings 515 and the exhaust opening 554 allow for mass and particulate flow out of the deck assembly 412 while still allowing for vortex management. The vortex management prevents vortices from being cast toward a suction side of the blade 100 which would then prevent mass flow underneath and into the one or more cutting chambers 522.

Figure 7:
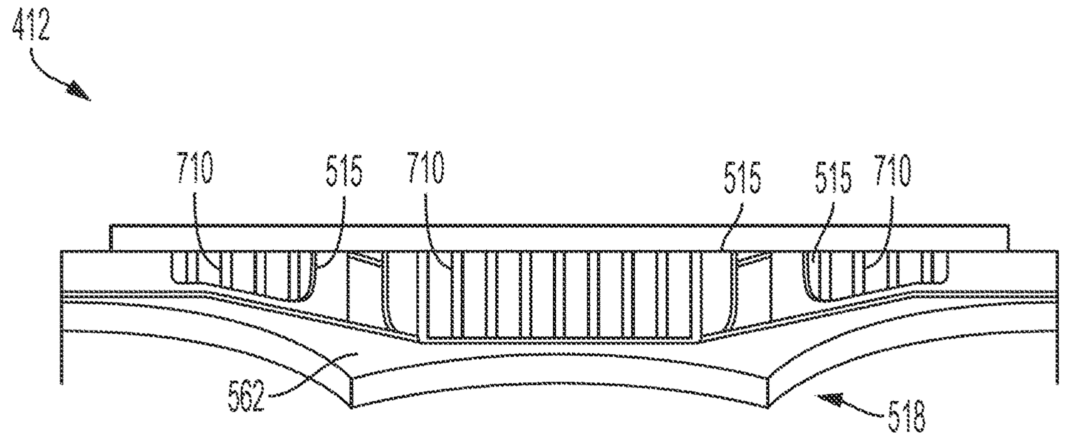
FIG. 7 depicts a bottom isometric view of a portion of a deck assembly in accordance with at least some examples of the present disclosure.

FIG. 7 depicts a bottom isometric view of a portion of a deck assembly 412 in accordance with at least some examples of the present disclosure. In some examples, the baffle body 518 further comprises a structure 710 configured to eject small clippings and redirect larger clippings back into the one or more cutting chambers 522. In some examples, the structure 710 comprises slats disposed in the one or more discharge openings 515.

The slats may have a conventional or aerodynamic shape that limit the size of ejected clumps of particulate. The slats may prevent large clumps (undesirable) from easily ejecting over the top, either forcing them to separate into smaller and less unsightly (or more easily compostable) pieces as the airflow pushes them through, or by causing tangential and/or rotating flows to pull the clump away from the exhaust opening 554 where they will be churned and have increased likelihood of being chopped into smaller pieces by the blade 100 again. In at least some such examples, the slats may provide an added structural-integrity benefit as well to the baffle body 518.

Figure 8:
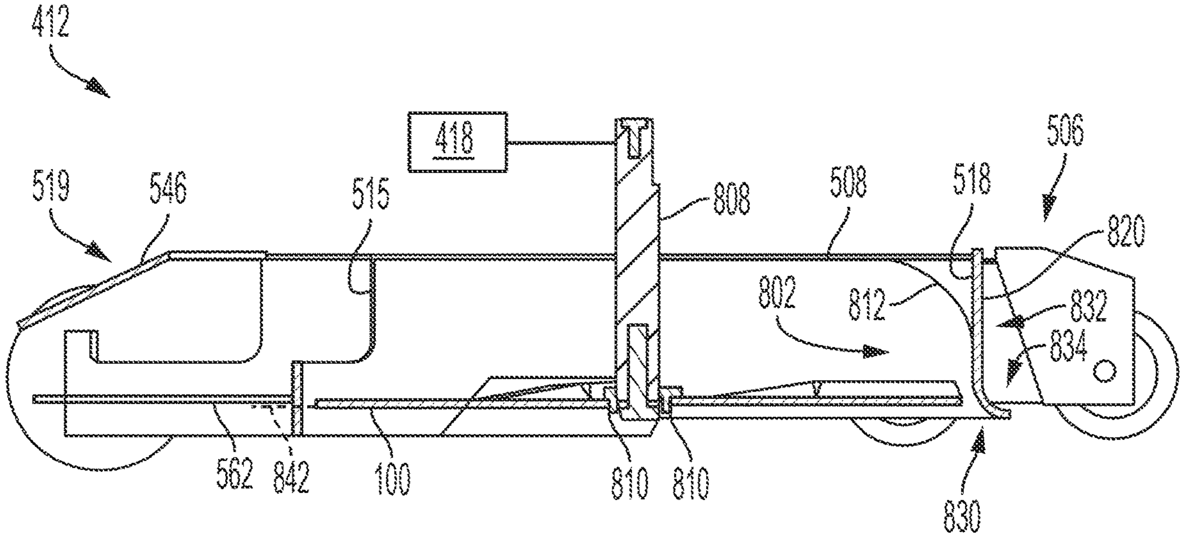
FIG. 8 depicts a schematic cross-sectional side view of a deck assembly in accordance with at least some examples of the present disclosure.

FIG. 8 depicts a schematic cross-sectional side view of a deck assembly 412 in accordance with at least some examples of the present disclosure. In some examples, one or more fasteners 810 may coupled the blade 100 to a shaft 808 of the motor 418. In some examples, a forward-facing portion 802 of the baffle body 518 comprises one or more of: a curved structure 812 along a portion of the baffle body 518 coupled to the deck housing 506. In at least some examples, the curved structure 812 may comprise a Coanda insert.

The curved structure 812 may generally be a rounded insert disposed proximate an upper end of a sidewall 820 of the baffle body 518. The curved structure 812 advantageously eliminates a corner which may lead to stagnant or turbulent flow, reducing mower efficiency. The curved structure reduces or removes low pressure above the blade 100. The curved structure 812 may be a modular plastic, metal, or composite insert that can be linked with other inserts and the deck assembly 412 to form a ring around one or more cutting chambers 222 of the deck assembly 412.

The curved structure 812, in some examples, may help vertical airflow stay attached to the baffle body 518 and ensures that mass-flow is moving as vertical as possible near the blade 100 instead of having a large lateral velocity component, all of which improving efficiency and/or promoting rear discharge, discharge of a particular coarseness, safety (e.g., preventing high velocity of larger potential projectiles), prevent damage to multiple blade systems proximate one another, etc. In at least some examples, the curved structure 812 may allow for vortices created inside the deck to be redirected in the direction determined (e.g., by a user, machine, processor, controller, etc.).

In some examples, the forward-facing portion 802 of the baffle body 518 comprises a diffuser 830 to promote laminar airflow in a vertical direction. In some examples, the diffuser 830 comprises one or more of a bell mouth. In some examples, the diffuser 830 includes an upper vertical portion 832 and a lower curved portion 834 extending downward and radially outward of the upper vertical portion 832. In some examples, a cutting plane 842 of the blade 100 is disposed vertically below the discharge opening 515.

Figure 9:
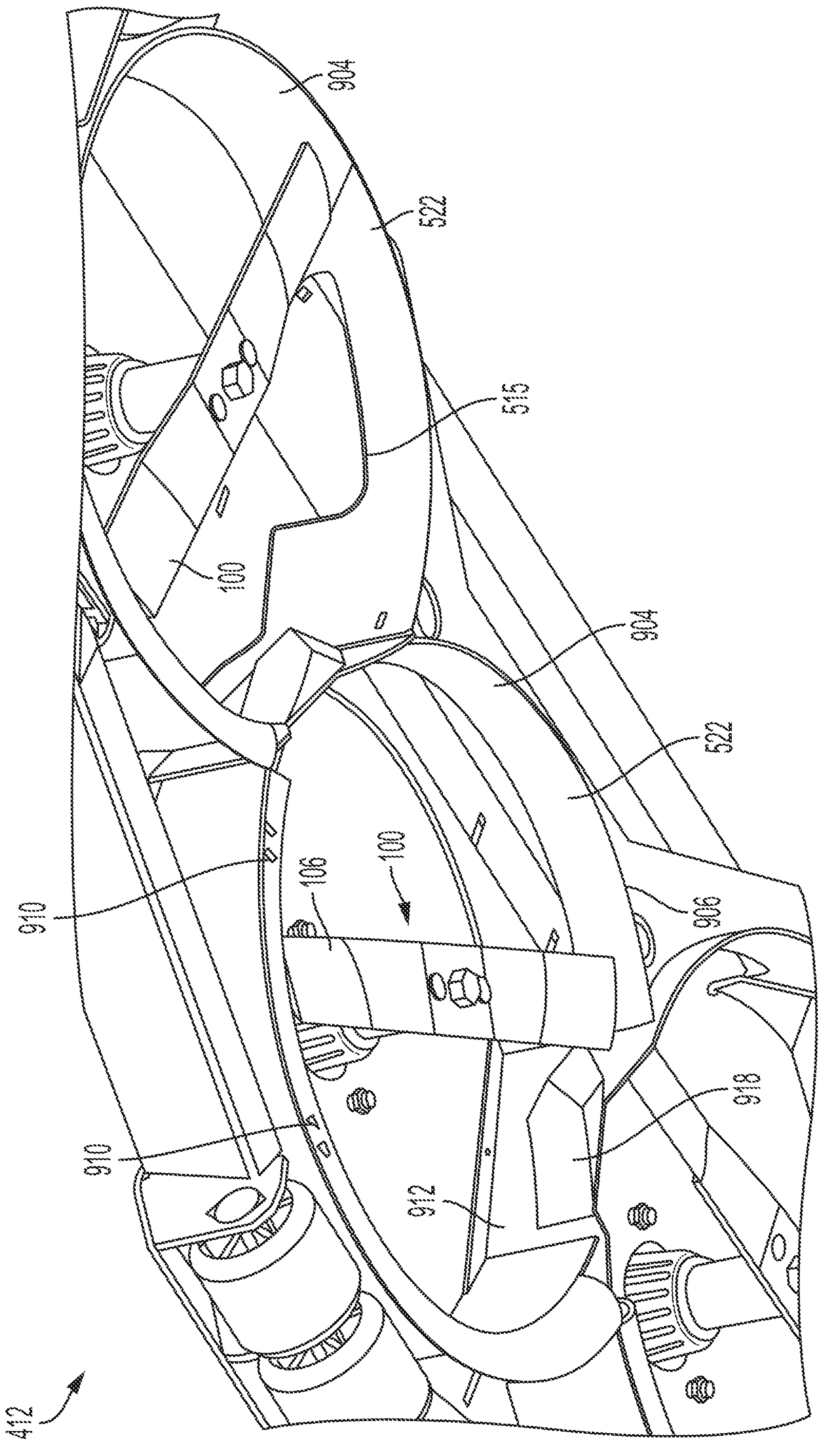
FIG. 9 depicts bottom isometric view of a deck assembly in accordance with at least some examples of the present disclosure.

FIG. 9 depicts bottom isometric view of a deck assembly 412 in accordance with at least some examples of the present disclosure. In some examples, the diffuser 830 includes vortex generators 910. The vortex generators 910 comprise small structures, for example, in the form of triangles or angled pieces, that promote flow attachment to the diffuser 830 by mixing or spinning air in a local region proximate the vortex generators 910. The vortex generators 910 may be integrated into the baffle body 518 or be coupled to the baffle body 518. In some examples, the vortex generators 910 are disposed on the lower curved portion 834 of the diffuser 830. The vortex generators 910 may also reduce lateral velocity of the mass flow which may be forcing grass to lay down instead of standing up.

In some examples, an inner surface 912 of the cutting chamber 522 includes an angled surface 918 disposed proximate a lower end 906 of a sidewall 904 of the cutting chamber 522. In some examples, the angled surface 918 is disposed above the cutting plane 842 of the blade 100. The angled surface 918 is configured to recirculate large clipping to control particulate size.

Figure 10:
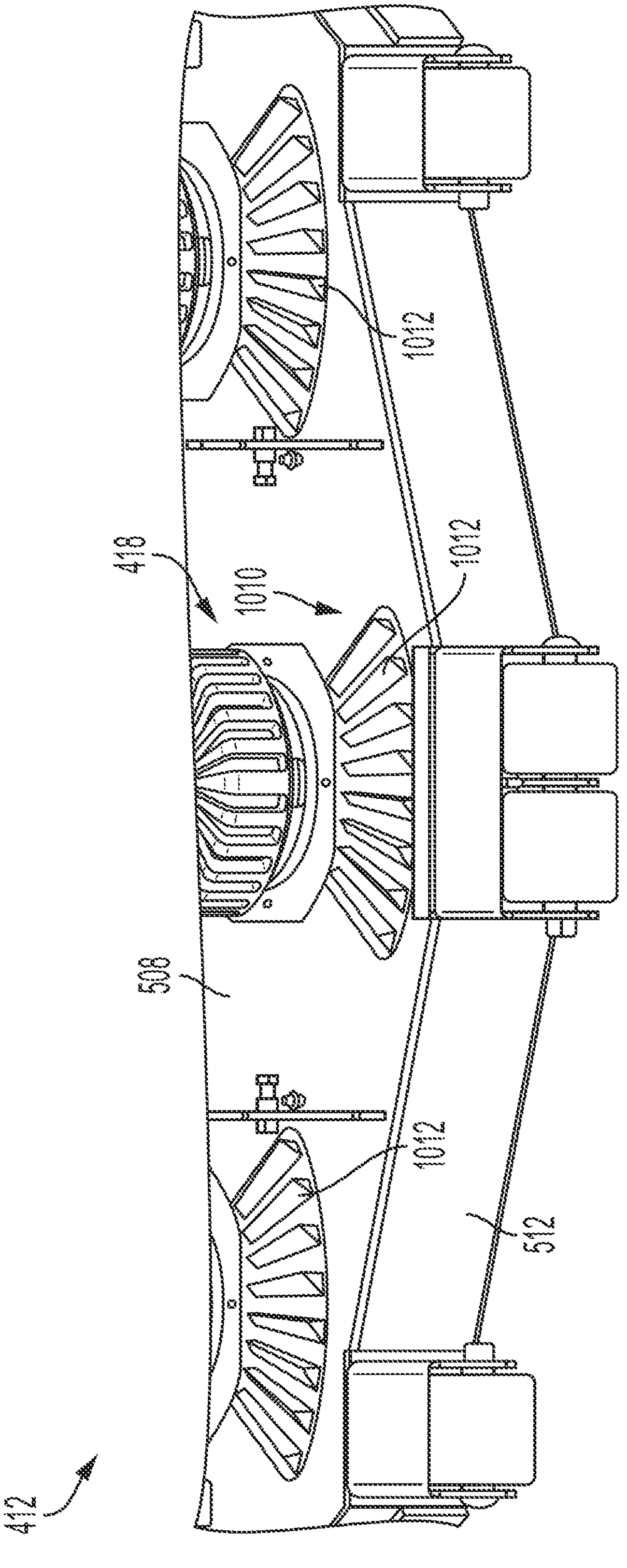
FIG. 10 depicts a top isometric view of a deck assembly in accordance with at least some examples of the present disclosure.

FIG. 10 depicts a top isometric view of a deck assembly 412 in accordance with at least some examples of the present disclosure. In some examples, the deck assembly 412 includes a vent 1010 disposed on the deck housing 506 above the cutting chamber 522 to relive pressure build up above the blade 100. In some examples, the vent 1010 is disposed through the upper plate 508. In some examples, the vent 1010 comprises an adjustable louver disposed above each of the one or more cutting chamber 522 facing in a direction opposite a blade spin direction. For example, the vent 1010 may comprise a plurality of horizontal slats with an angled covering 1012. The size of the openings of the vent 1010 may be adjustable, for example, by selectively covering portions of the plurality of horizontal slats or otherwise actuating a mechanism for modulating the size. The direction opposite the blade spin direction advantageously allows for air to flow through the louver while preventing clippings (which are heavier than air) from exiting through the louver. In some examples, the vent 1010 is arranged proximate the intake side 514 to provide vertical airflow.

Figure 11:
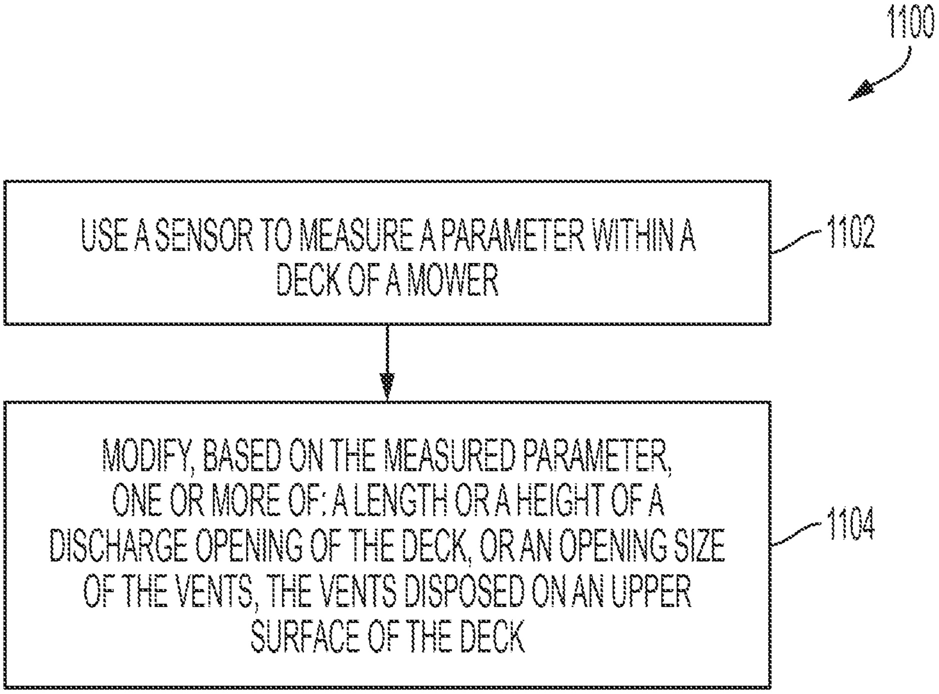
FIG. 11 depicts a flow chart of a method for adjusting one or more of baffles or vents of a mower in accordance with at least some examples of the present disclosure.

FIG. 11 depicts a flow chart of a method 1100 for adjusting one or more of baffles (i.e. baffle body 518) or vents (i.e., vents 1010) of a mower (i.e., mower 400) in accordance with at least some examples of the present disclosure. At 1102, the method 1100 includes using a sensor (i.e. sensor 450) to measure a parameter within a deck (i.e. deck assembly 412) of the mower. In some examples, the parameter is a pressure, a temperature, torque of a motor (i.e., motor 418) of the mower, or a strain of the motor.

At 1104, the method 1100 includes modifying, based on the measured parameter, one or more of: a length or a height of a discharge opening (i.e., discharge opening 515) of the deck, or an opening size of the vents, the vents disposed on an upper surface of the deck. In some examples, the vent comprises an adjustable louver facing in a direction opposite a blade spin direction.

In some examples, the method 1100 includes increasing the length or the height of the discharge opening when the pressure, the temperature, the torque on the motor, or a strain of the motor is greater than a threshold pressure, threshold temperature, threshold torque on the motor, or threshold strain on the motor. In some examples, the discharge opening is disposed about 0.5 inches or more above a cutting plane (i.e., cutting plane 842) of the mower. The discharge opening may be adjusted via sliding or rotating components or surfaces that selectively cover portions of the discharge opening.

In some examples, the method 1100 includes increasing the opening size of the vents when the pressure, the temperature, the torque on the motor, or a strain of the motor is greater than a threshold pressure, threshold temperature, threshold torque on the motor, or threshold strain on the motor.

While the foregoing is directed to examples of the present disclosure, other and further examples of the disclosure may be devised without departing from the basic scope thereof.

The invention claimed is:

1. An assembly, comprising:

a substantially circular baffle body configured to at least partially surround a blade and defining a cutting chamber, the baffle body including an intake side and a discharge side, wherein an upper portion of the baffle body includes a discharge opening proximate the discharge side and a diameter of the baffle body is less than or equal to approximately one half of an inch larger than a diameter of the blade, and the baffle body further comprises adjustable slats disposed within the discharge opening, wherein the intake side of the baffle body includes a diffuser comprising a bell mouth configured to promote laminar flow, and an angled surface coupled to the baffle and configured to eject smaller clippings and redirect larger clippings back into the cutting chamber.

2. The Assembly of claim 1, wherein the discharge opening is adjustable in size.

3. The assembly of claim 1, wherein the baffle body is configured to at least partially surround a second blade and a third blade.

4. The assembly of claim 1, further comprising a rounded insert disposed proximate an upper end of a sidewall of the baffle body.

5. The assembly of claim 1, wherein an inner surface of the cutting chamber includes an angled surface disposed proximate a lower end of a sidewall of the cutting chamber.

6. A deck assembly for a mower, comprising:

a deck housing having an upper plate and sidewalls extending down from the upper plate to define an interior volume of the deck housing; and a baffle body coupled to the deck housing within the interior volume defining a cutting chamber and having a substantially circular structure with a diameter approximately equal to a diameter of a blade to be used with the mower and at least partially encircling the blade, wherein an upper portion of the baffle body comprises a discharge opening proximate a discharge side, and the baffle body further comprises adjustable slats disposed within the discharge opening, wherein a forward-facing portion of the baffle body comprises a diffuser comprising a bell mouth to promote laminar airflow in a vertical direction.

7. The deck assembly of claim 6, wherein a portion of the baffle body is adjustable to modify one or more of a length or a height of the discharge opening.

8. The deck assembly of claim 6, further comprising a vent disposed on the deck housing above the cutting chamber.

9. The deck assembly of claim 8, wherein the vent comprises an adjustable louver facing in a direction opposite a blade spin direction.

10. A method for adjusting one or more of baffles or vents of a mower, comprising:

using a sensor to measure a parameter within a deck of a mower, wherein the parameter comprises a strain of a motor of the mower; and automatically modifying, by one or more processors associated with the mower and based on the measured parameter, one or more of:

a length or a height of a discharge opening of the deck, when the strain on the motor is greater than a threshold strain on the motor, or an opening size of the vents, the vents disposed on an upper surface of the deck, when the strain on the motor is greater than the threshold strain on the motor.

11. The method of claim 10, wherein the discharge opening is disposed about 0.5 inches or more above a cutting plane of the mower.

12. The method of claim 10, wherein the vent comprises an adjustable louver facing in a direction opposite a blade spin direction.

* * * * *